US012609470B2

(12) United States Patent
Hsu et al.

(10) Patent No.: US 12,609,470 B2
(45) Date of Patent: Apr. 21, 2026

(54) WIRE-TO-BOARD CONNECTOR AND ASSEMBLY THEREOF WITH IMPROVED LAYOUT OF CONDUCTIVE TERMINALS

(71) Applicant: LUXSHARE PRECISION INDUSTRY COMPANY LIMITED, Shenzen (CN)

(72) Inventors: Chien-Yu Hsu, Shenzhen (CN); Hui-Hsueh Chiang, Shenzhen (CN); Shih-Tung Lin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 321 days.

(21) Appl. No.: 18/197,765

(22) Filed: May 16, 2023

(65) Prior Publication Data

US 2024/0063564 A1 Feb. 22, 2024

(30) Foreign Application Priority Data

Aug. 22, 2022 (CN) ......................... 202211004415.7

(51) Int. Cl.
*H01R 12/79* (2011.01)
*H01R 12/77* (2011.01)

(52) U.S. Cl.
CPC ........... *H01R 12/79* (2013.01); *H01R 12/774* (2013.01); *H01R 12/775* (2013.01)

(58) Field of Classification Search
CPC .... H01R 12/79; H01R 12/774; H01R 12/775; H01R 12/00; H01R 12/7047;
(Continued)

(56) References Cited

U.S. PATENT DOCUMENTS 11,081,821 B2 * 8/2021 Blackburn ............. H01R 12/79
11,258,222 B2 2/2022 Sekido
(Continued)

FOREIGN PATENT DOCUMENTS

CN 101355197 A 1/2009
CN 211480350 U 9/2020
(Continued)

OTHER PUBLICATIONS

English translation of CN113422232A (Year: 2025).*
English translation of CN113422232 (Year: 2025).*

*Primary Examiner* — Tulsidas C Patel
*Assistant Examiner* — Carlos E Lopez-Pagan
(74) *Attorney, Agent, or Firm* — Birch, Stewart, Kolasch & Birch, LLP

(57) ABSTRACT

A wire-to-board connector includes an insulating body, a number of first conductive terminals, a number of second conductive terminals, a number of first cables and a number of second cables. The first conductive terminals are arranged at intervals along a first direction. The first conductive terminal includes a first elastic mating portion and a first cable connection portion. The second conductive terminal includes a second elastic mating portion and a second cable connection portion. The first cable connection portion and the second cable connection portion are arranged in a misalignment manner along a second direction perpendicular to the first direction. The first elastic mating portion and the second elastic mating portion protrude beyond a first surface of the insulating body so as to abut against metal conductive pads of a circuit board. Besides, a wire-to-board connector assembly having the wire-to-board connector is also disclosed.

12 Claims, 14 Drawing Sheets

(58) Field of Classification Search

CPC .......................... H01R 12/7052; H01R 12/714; H01R 12/728; H01R 12/2464; H01R 13/42; H01R 13/2464; H01R 13/6471; H01R 13/6581

See application file for complete search history.

(56) References Cited

U.S. PATENT DOCUMENTS

| | | | | |
|---|---|---|---|---|
| 2003/0036304 | A1* | 2/2003 | Soubh .................... | H01R 12/62 439/493 |
| 2021/0265785 | A1* | 8/2021 | Mongold ........... | H01R 13/6587 |
| 2021/0345506 | A1* | 11/2021 | Tsuji .................. | H01R 12/7047 |

FOREIGN PATENT DOCUMENTS

| | | | | |
|---|---|---|---|---|
| CN | 113422232 A * | 9/2021 | ........... | H01R 13/652 |
| WO | WO 2021/001688 A1 | 1/2021 | | |

* cited by examiner

WIRE-TO-BOARD CONNECTOR AND ASSEMBLY THEREOF WITH IMPROVED LAYOUT OF CONDUCTIVE TERMINALS

CROSS-REFERENCE TO RELATED APPLICATION

This patent application claims priority of a Chinese Patent Application No. 202211004415.7, filed on Aug. 22, 2022 and titled “WIRE-TO-BOARD CONNECTOR”, the entire content of which is incorporated herein by reference.

TECHNICAL FIELD

The present disclosure relates to a wire-to-board connector and an assembly thereof, which belongs to a technical field of connectors.

BACKGROUND

For wire-to-board connectors in the related art, with the increasing density of terminals and the miniaturization trend of connectors, this brings great challenges to the arrangement of terminals and the connection between terminals and cables.

Therefore, it is necessary to provide an improved wire-to-board connector and an assembly thereof.

SUMMARY

An object of the present disclosure is to provide a wire-to-board connector and an assembly thereof, in which conductive terminals can be easily arranged.

In order to achieve the above object, the present disclosure adopts the following technical solution: a wire-to-board connector, including: an insulating body including a first surface; a plurality of first conductive terminals arranged at intervals along a first direction, each first conductive terminal including a first elastic mating portion, at least part of the plurality of first conductive terminals including a first cable connection portion; a plurality of second conductive terminals arranged at intervals along the first direction, each second conductive terminal including a second elastic mating portion, at least part of the plurality of second conductive terminals including a second cable connection portion; the first elastic mating portion, the first cable connection portion, the second elastic mating portion and the second cable connection portion being arranged in sequence along a second direction which is perpendicular to the first direction; the first cable connection portions of the plurality of first conductive terminals being flush with the second cable connection portions of the plurality of second conductive terminals; a plurality of first cables connected to the first cable connection portions of the plurality of first conductive terminals; and a plurality of second cables connected to the second cable connection portions of the plurality of second conductive terminals; wherein the plurality of first cables and the plurality of second cables are located on a same layer; the first cable connection portions of the plurality of first conductive terminals and the second cable connection portions of the plurality of second conductive terminals are arranged in a misalignment manner along the second direction; the first elastic mating portions and the second elastic mating portions protrude beyond the first surface of the insulating body; and the first elastic mating portions and the second elastic mating portions are configured to abut against metal conductive pads on a circuit board.

In order to achieve the above object, the present disclosure adopts the following technical solution: a wire-to-board connector assembly, including: a circuit board including a plurality of metal conductive pads; a wire-to-board connector mounted on the circuit board; and a fastener fixing the wire-to-board connector to the circuit board; w % herein the wire-to-board connector includes: an insulating body including a first surface; a plurality of first conductive terminals arranged at intervals along a first direction, each first conductive terminal including a first elastic mating portion, at least part of the plurality of first conductive terminals including a first cable connection portion; a plurality of second conductive terminals arranged at intervals along the first direction, each second conductive terminal including a second elastic mating portion, at least part of the plurality of second conductive terminals including a second cable connection portion; the first elastic mating portion, the first cable connection portion, the second elastic mating portion and the second cable connection portion being arranged in sequence along a second direction which is perpendicular to the first direction; the first cable connection portions of the plurality of first conductive terminals being flush with the second cable connection portions of the plurality of second conductive terminals; a plurality of first cables connected to the first cable connection portions of the plurality of first conductive terminals; and a plurality of second cables connected to the second cable connection portions of the plurality of second conductive terminals; wherein the first cable connection portions of the plurality of first conductive terminals and the second cable connection portions of the plurality of second conductive terminals are arranged in a misalignment manner along the second direction; the first elastic mating portions and the second elastic mating portions protrude beyond the first surface of the insulating body to abut against the plurality of metal conductive pads of the circuit board.

Compared with the prior art, the plurality of first cables and the plurality of second cables in the present disclosure are located on the same layer, thereby avoiding the height required for cable stacking, and facilitating the miniaturization of the wire-to-board connector. Besides, by arranging the first cable connection portions of the plurality of first conductive terminals and the second cable connection portions of the plurality of second conductive terminals in the misalignment manner along the second direction, it is beneficial to simplify the arrangement of the first conductive terminals and the second conductive terminals.

DETAILED DESCRIPTION

Figure 1:
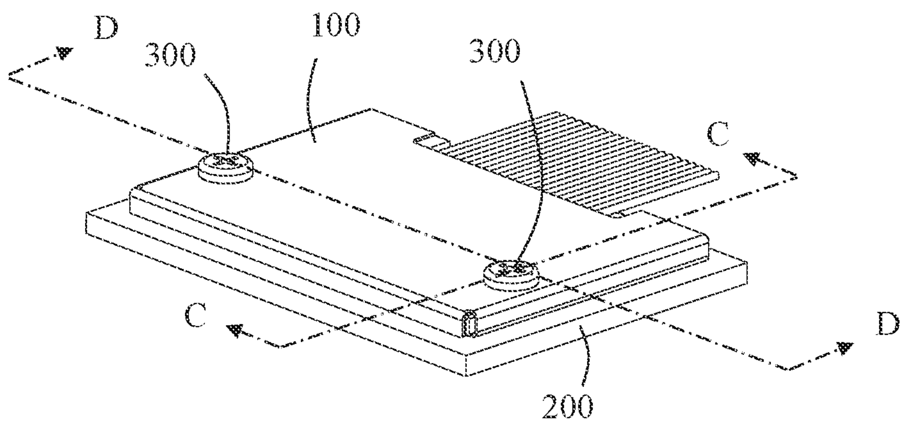
FIG. 1 is a schematic perspective view of a wire-to-board connector assembly in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear". "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
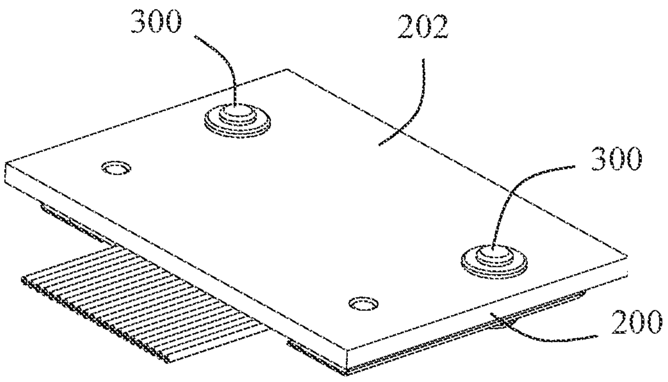
FIG. 2 is a schematic perspective view of FIG. 1 from another angle.
Figure 3:
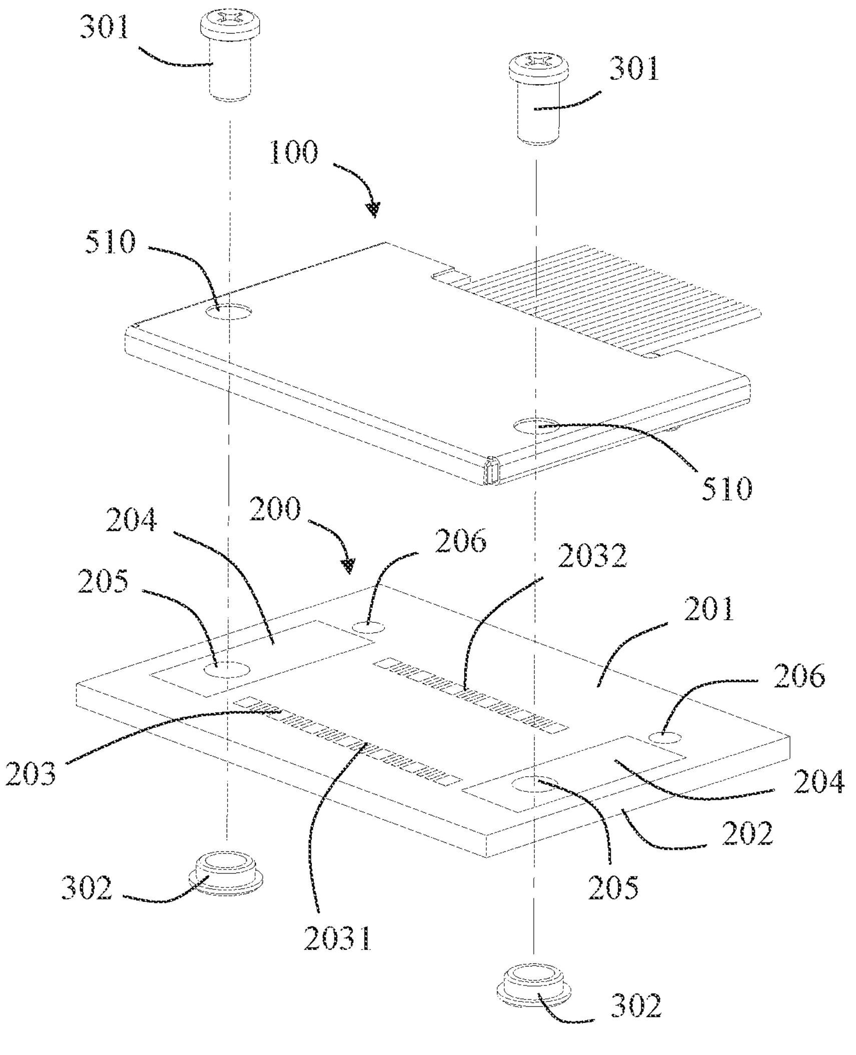
FIG. 3 is a partial perspective exploded view of FIG. 1.
Figure 4:
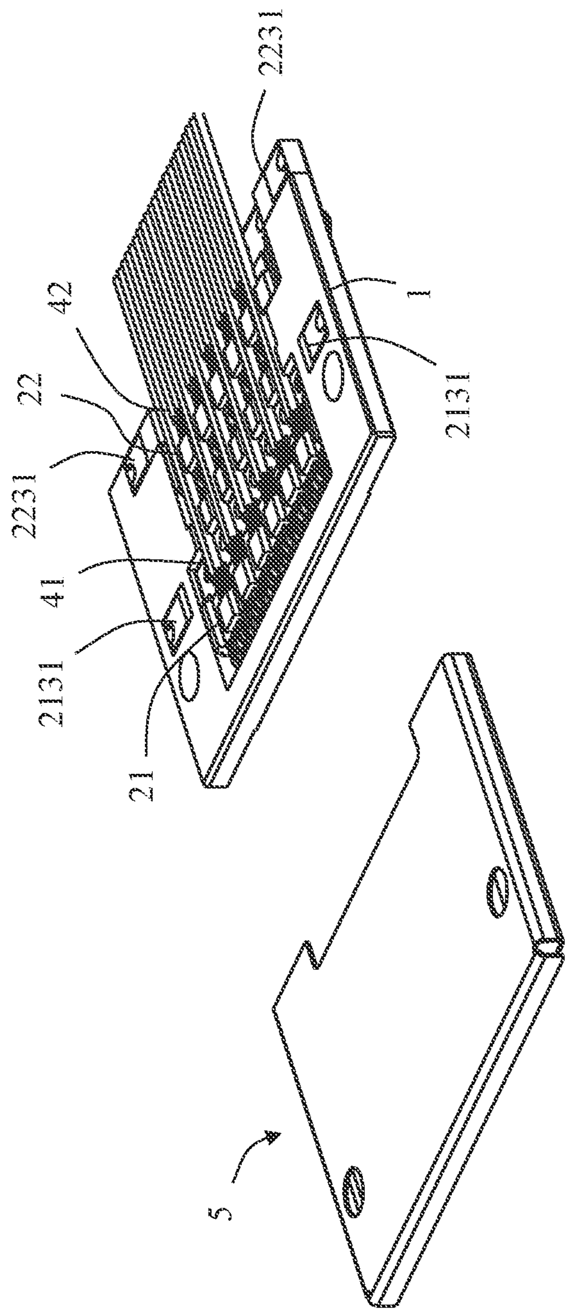
FIG. 4 is a partial perspective exploded view of the wire-to-board connector in FIG. 3.

Referring to FIG. 1 to FIG. 3, the present disclosure discloses a wire-to-board connector assembly, which includes a circuit board 200, a wire-to-board connector 100 mounted on the circuit board 200, and at least one fastener 300 fixing the wire-to-board connector 100 to the circuit board 200.

Referring to FIG. 2 and FIG. 3, in the embodiment illustrated in the present disclosure, the circuit board 200 includes a first surface 201 (for example, an upper surface), a second surface 202 (for example, a lower surface), a plurality of metal conductive pads 203 exposed on the first surface 201, a plurality of metal ground pads 204 exposed on the first surface 201, a plurality of mounting holes 205 extending through the first surface 201 and the second surface 202, and a plurality of positioning holes 206 extending through the first surface 201 and the second surface 202. In the illustrated embodiment of the present disclosure, the plurality of metal conductive pads 203 include a plurality of first metal conductive pads 2031 located in a first row and a plurality of second metal conductive pads 2032 located in a second row. The plurality of first metal conductive pads 2031 and the plurality of second metal conductive pads 2032 are located in two parallel rows. The plurality of metal grounding sheets 204 are located outside the plurality of metal conductive pads 203.

Referring to FIG. 3, in the illustrated embodiment of the present disclosure, two fasteners 300 are provided. Each fastener 300 includes a screw 301 and a nut 302 matched with each other. In the illustrated embodiment of the present disclosure, the nut 302 is at least partially inserted into a corresponding mounting hole 205 to utilize the thickness of the circuit board 200 so as to reduce the height of the wire-to-board connector assembly as much as possible.

Referring to FIG. 4 to FIG. 11, the wire-to-board connector 100 includes an insulating body 1, a first terminal module 21, a second terminal module 22, a plurality of first cables 41, a plurality of second cables 42, and an outer metal shell 5.

Figure 5:
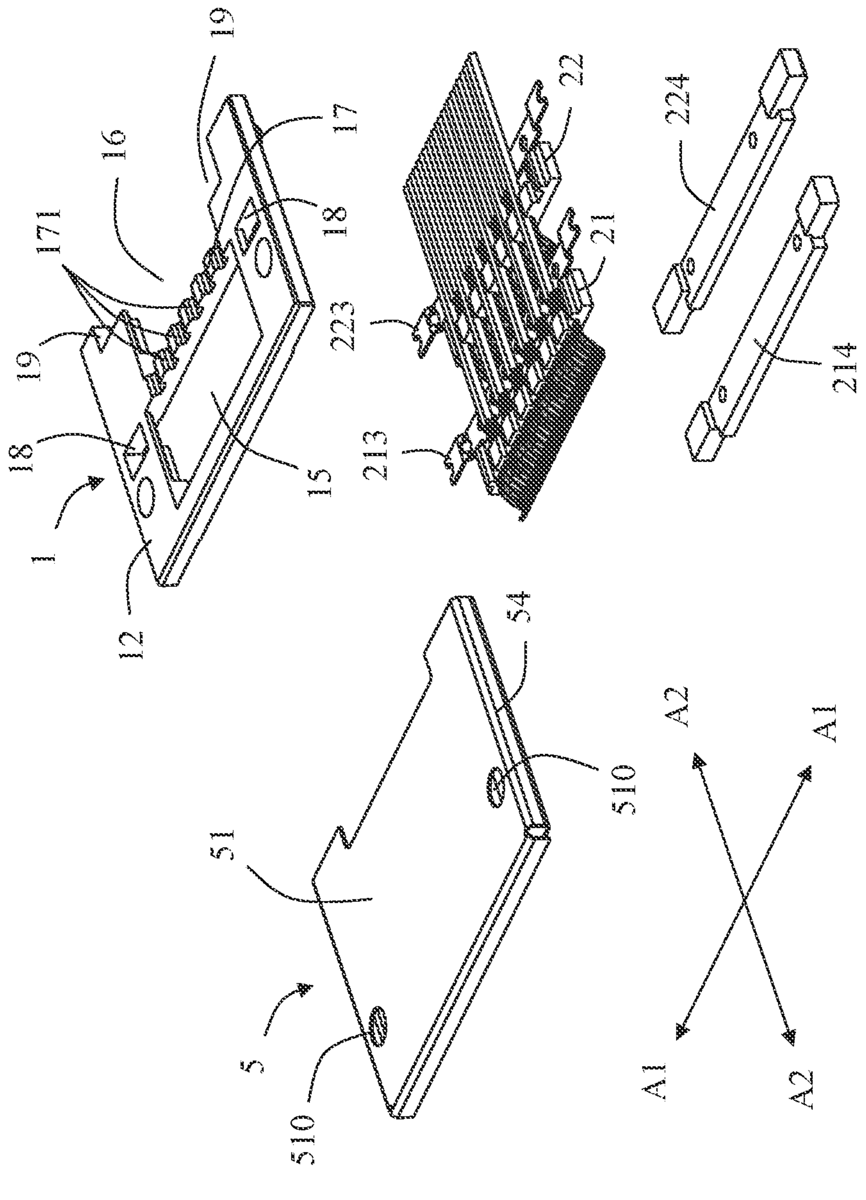
FIG. 5 is a further perspective exploded view of FIG. 4.
Figure 6:
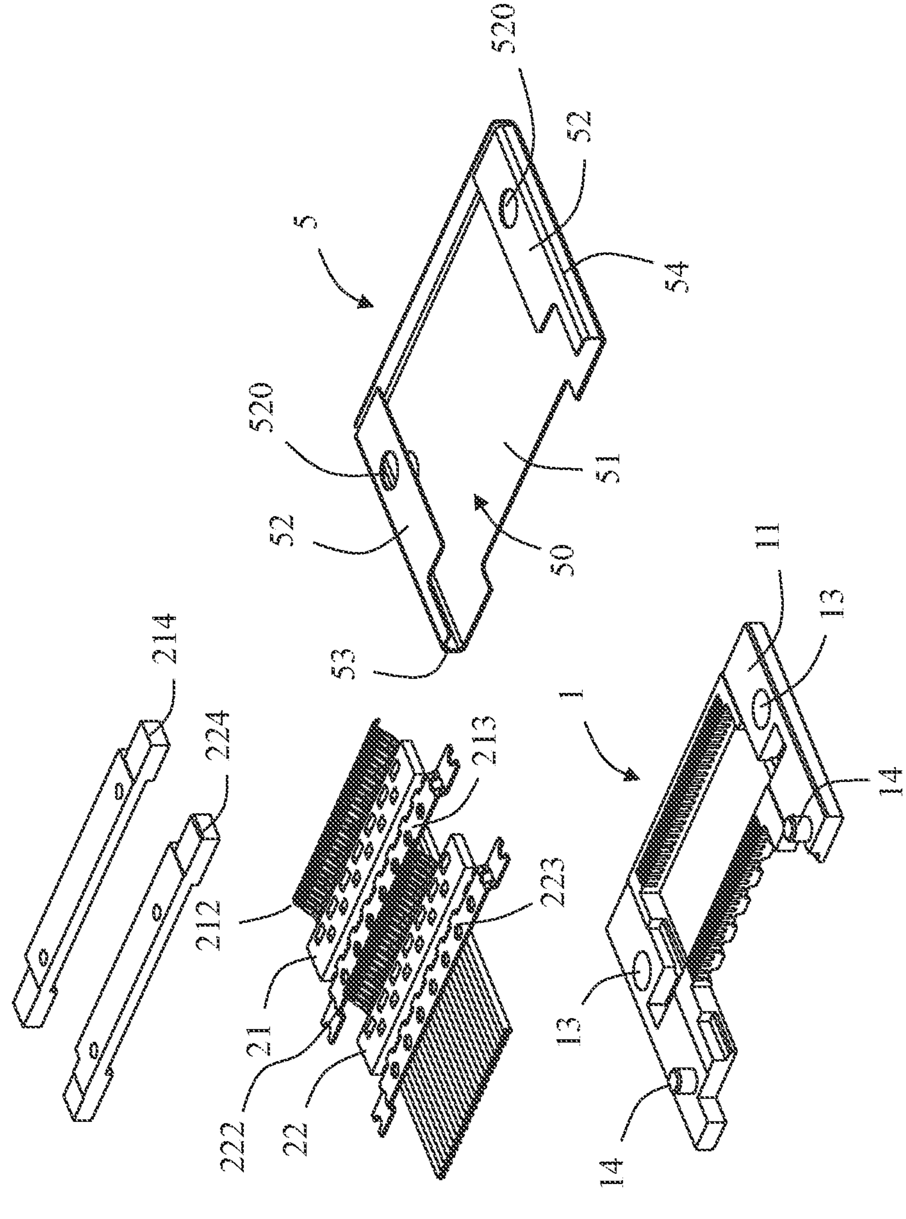
FIG. 6 is a perspective exploded view of FIG. 5 from another angle.

Referring to FIG. 5 and FIG. 6, the insulating body 1 includes a first surface 11 (for example, a bottom surface), a mating surface 12 (for example, a top surface) opposite to the first surface 11, a plurality of mounting through holes 13 extending through the mating surface 12 and the first surface 11, a plurality of positioning posts 14 extending downwardly beyond the first surface 11, a first receiving opening 15 extending through the mating surface 12 and the first surface 11, a second receiving opening 16 extending through the mating surface 12 and the first surface 11, and a partition wall 17 located between the first receiving opening 15 and the second receiving opening 16. After the wire-to-board connector 100 is assembled, the mounting through holes 13 are aligned with corresponding mounting holes 205 for the fasteners 300 to pass through. The positioning posts 14 are used for being inserted into the positioning holes 206 to position the wire-to-board connector 100 on the circuit board 200. In the illustrated embodiment of the present disclosure, the first terminal module 21 is installed in the first receiving opening 15 from the first surface 11; and the second terminal module 22 is installed in the second receiving opening 16 from the first surface 11. The partition wall 17 defines a plurality of cable positioning slots 171 for positioning the plurality of first cables 41.

Figure 7:
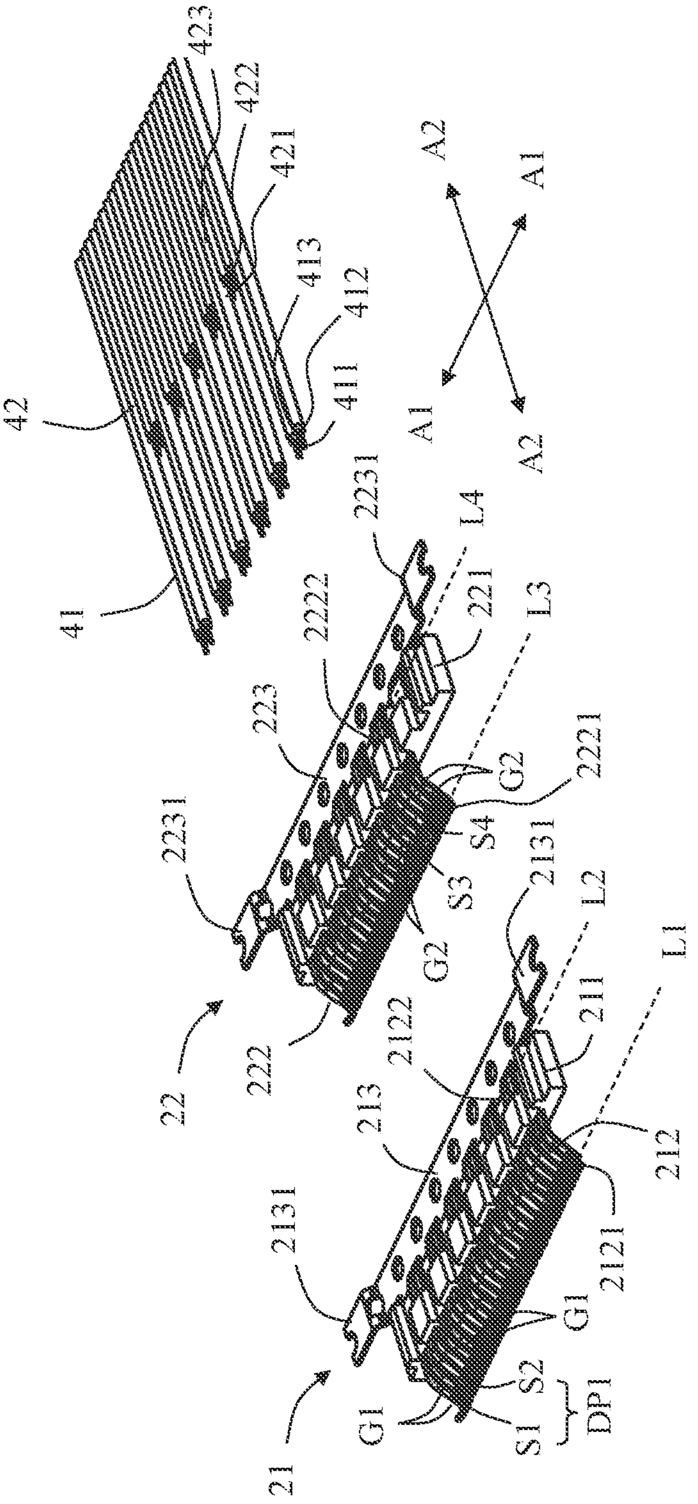
FIG. 7 is a perspective exploded view of a first terminal module, a second terminal module, a plurality of first cables and a plurality of second cables in FIG. 5.

As shown in FIG. 7, the first terminal module 21 includes a first insulating block 211 and a plurality of first conductive terminals 212 fixed to the first insulating block 211. In the illustrated embodiment of the present disclosure, the plurality of first conductive terminals 212 are insert-molded with the first insulating block 211. Of course, it is understandable to those skilled in the art that the plurality of first conductive terminals 212 may also be fixed to the first insulating block 211 in other ways (for example, by assembling).

The plurality of first conductive terminals 212 are arranged at intervals along a first direction A1-A1 (for example, a left-right direction). Each first conductive terminal 212 includes a first elastic mating portion 2121. At least part of the first conductive terminals 212 includes a first cable connection portion 2122. Referring to a dotted line in an upper part of FIG. 9, in the illustrated embodiment of the present disclosure, each first conductive terminal 212 is axially symmetrical. For example, a centerline of the first elastic mating portion 2121 is aligned with a centerline of the first cable connection portion 2122. Each first elastic mating portion 2121 protrudes beyond the first insulating block 211 in a cantilever manner. The first elastic mating portions 2121 extend downwardly beyond the first surface 11 so as to abut against the plurality of first metal conductive pads 2031. Referring to FIG. 7, in the illustrated embodiment of the present disclosure, the first elastic mating portions 2121 of the plurality of first conductive terminals 212 are arranged in a first row L1; and the first cable connection portions 2122 of the plurality of first conductive terminals 212 are arranged in a second row L2. The first cable connection portions 2122 of the plurality of first conductive terminals 212 are disposed on the first insulating block 211 so as to be connected to the first cables 41.

In the illustrated embodiment of the present disclosure, the plurality of first conductive terminals 212 includes a plurality of first signal terminals S1, a plurality of second signal terminals S2 and a plurality of first ground terminals G1. Adjacent first signal terminal S1 and the second signal terminal S2 form a first differential pair DP1. In other words, the first signal terminal S1 and the second signal terminal S2 located adjacent to the first signal terminal S1 form the first differential pair DP1. Each of two sides of the first differential pair DP1 is provided with one first ground terminal G1. In other words, the two sides of the first differential pair DP1 are provided with two first ground terminals G1, respectively. In the illustrated embodiment of the present disclosure, the first ground terminal G1 is provided with two bifurcated first elastic mating portions 2121. In this way, at positions corresponding to the first elastic mating portion 2121 of the first signal terminal S1 and the first elastic mating portion 2121 of the second signal terminal S2, a total width of the two first elastic mating portions 2121 of the first ground terminal G1 is generally not smaller than (that is, greater than or equal to, the same below) a width of the first elastic mating portion 2121 of the first signal terminal S1. At the same time, the total width of the two first elastic mating portions 2121 of the first ground terminal G1 is generally not smaller than a width of the first elastic mating portion 2121 of the second signal terminal S2. As a result, a better shielding effect is provided. In the illustrated embodiment of the present disclosure, both the first signal terminal S1 and the second signal terminal S2 have the first cable connection portion 2122. However, the first ground terminal G1 is not provided with the first cable connection portion 2122.

Referring to FIG. 5 and FIG. 6, in the embodiment shown in the present disclosure, the first terminal module 21 further includes a first metal sheet 213 and a first insulating bar 214 formed on the first metal sheet 213. The plurality of first ground terminals G1 and the first metal sheet 213 are integrally formed (for example, stamped). The plurality of first ground terminals G1 are connected to the first metal sheet 213 to increase the grounding area. The first metal sheet 213 includes a first base portion and a plurality of first grounding portions 2131 bent upwardly and protruding from two sides of the first base portion. Correspondingly, the insulating body 1 is also provided with a plurality of first notches 18. In the illustrated embodiment of the present disclosure, the plurality of first notches 18 are a plurality of through holes extending through the mating surface 12 and the first surface 11. In the illustrated embodiment of the present disclosure, each through hole is of a rectangle shape. Of course, in other embodiments, the through holes may also be in other shapes, which will not be repeated in the present disclosure. The first grounding portion 2132 is exposed from the first notch 18 to the mating surface 12 of the insulating housing 1 so as to be in contact with the outer metal shell 5.

The second terminal module 22 includes a second insulating block 221 and a plurality of second conductive terminals 222 fixed to the second insulating block 221. In the illustrated embodiment of the present disclosure, the plurality of second conductive terminals 222 are insert-molded with the second insulating block 221. Of course, it is understandable to those skilled in the art that the plurality of second conductive terminals 222 can also be fixed to the second insulating block 221 in other ways (for example, by assembling). In another embodiment of the present disclosure, the insulating body 1 can also be fixed to the first terminal module 21 and the second terminal module 22 by secondary molding.

The plurality of second conductive terminals 222 are arranged at intervals along the first direction A1-A1 (for example, the left-right direction). Each second conductive terminal 222 includes a second elastic mating portion 2221. At least part of the second conductive terminals 222 includes a second cable connection portion 2222. Referring to a dotted line in a lower part of FIG. 9, in the embodiment shown in the present disclosure, each second conductive terminal 222 is axially symmetrical. For example, a centerline of the second elastic mating portion 2221 is aligned with a centerline of the second cable connection portion 2222. Each second elastic mating portion 2221 protrudes beyond the second insulating block 221 in a cantilever manner. The second elastic mating portions 2221 extend downwardly beyond the first surface 11 to abut against the plurality of second metal conductive pads 2032. In the illustrated embodiment of the present disclosure, the second elastic mating portions 2221 of the plurality of second conductive terminals 222 are arranged in a third row L3; and the second cable connection portions 2222 of the plurality of second conductive terminals 222 are arranged in a fourth row L4. The first row L1, the second row L2, the third row L3 and the fourth row L4 are parallel to one another. The first elastic mating portions 2121, the first cable connection portions 2122, the second elastic mating portions 2221 and the second cable connection portions 2222 are arranged in sequence along a second direction A2-A2 perpendicular to the first direction A1-A1. The first cable connection portions 2122 of the plurality of first conductive terminals 212 are flush with the second cable connection portions 2222 of the plurality of second conductive terminals 222. The so-called "flush" means that surfaces of the first cable connection portions 2122 and the second cable connection portions 2222 on a same side are approximately at the same height, but slight height adjustments are allowed, for example, due to tolerances caused by manufacturing processes, as long as the tolerances are within a reasonable range; or, due to adaptive height adjustments for adapting to different cables. For example, in an embodiment of the present disclosure, the cable may be a cable whose specification is between AWG 28 and AWG 40. Take AWG 32 as an example for the cable, as long as its diameter is within a reasonable range, it is considered qualified. In order to adapt to the AWG 32 cable, the height of the first cable connection portions 2122 and the second cable connection portions 2222 may need to be slightly adjusted. Since this adjustment is very small, the first cable connection portions 2122 and the second cable connection portions 2222 at this time are still considered to be flush. The second cable connection portions 2222 of the plurality of second conductive terminals 222 are disposed on the second insulating block 221 so as to be connected to the second cables 42.

Referring to FIG. 7, in the embodiment illustrated in the present disclosure, the plurality of second conductive terminals 222 include a plurality of third signal terminals S3, a plurality of fourth signal terminals S4 and a plurality of second ground terminals G2. Adjacent third signal terminal S3 and the fourth signal terminal S4 form a second differential pair DP2. In other words, the third signal terminal S3 and the fourth signal terminal S4 located adjacent to the third signal terminal S3 form the second differential pair DP2. Each of two sides of the second differential pair DP2 is provided with one second ground terminal G2. In other words, two sides of the second differential pair DP2 are provided with two second ground terminal G2, respectively. In the illustrated embodiment of the present disclosure, the second ground terminal G2 is provided with two bifurcated second elastic mating portions 2221. In this way, at positions corresponding to the second elastic mating portions 2221 of the third signal terminals S3 and the second elastic mating portions 2221 of the fourth signal terminals S4, a total width of the two second elastic mating portions 2221 of the second ground terminal G2 is generally not smaller than a width of the second elastic mating portion 2221 of the third signal terminal S3; and the total width of the two second elastic mating portions 2221 of the second ground terminal G2 is generally not smaller than a width of the second elastic mating portion 2221 of the fourth signal terminal S4. As a result, a better shielding effect is provided.

Referring to FIG. 5 and FIG. 6, in the embodiment shown in the present disclosure, the second terminal module 22 further includes a second metal sheet 223 and a second insulating bar 224 formed on the second metal sheet 223. The plurality of second ground terminals G2 and the second metal sheet 223 are integrally formed (for example, stamped). The plurality of second ground terminals G2 are connected to the second metal sheet 223 to increase the grounding area. The second metal sheet 223 includes a second base portion and a plurality of second grounding portions 2231 bent upwardly and protruding from two sides of the second base portion. Correspondingly, the insulating body 1 is also provided with a plurality of second notches 19. In the illustrated embodiment of the present disclosure, the plurality of second notches 19 are a plurality of openings extending through the mating surface 12 and the first surface 11. In the illustrated embodiment of the present disclosure, each opening extends backwardly through a rear end surface of the insulating housing 1. Of course, in other embodiment, each second notch 19 may also be configured in a shape and structure similar to that of the first notch 18, which will not be repeated in the present disclosure. The second ground portion 2231 is exposed to the mating surface 12 of the insulating housing 1 through the second notch 19 to be in contact with the outer metal shell 5. In the illustrated embodiment of the present disclosure, both the first grounding portion 2131 and the second grounding portion 2231 are provided with arc-shaped notches on the outside, so as to be better fixed with the outer metal shell 5 by means of welding or the like.

In the illustrated embodiment of the present disclosure, the first terminal module 21 and the second terminal module 22 are of the same configuration, so that parts can be shared and costs can be reduced.

Figure 8:
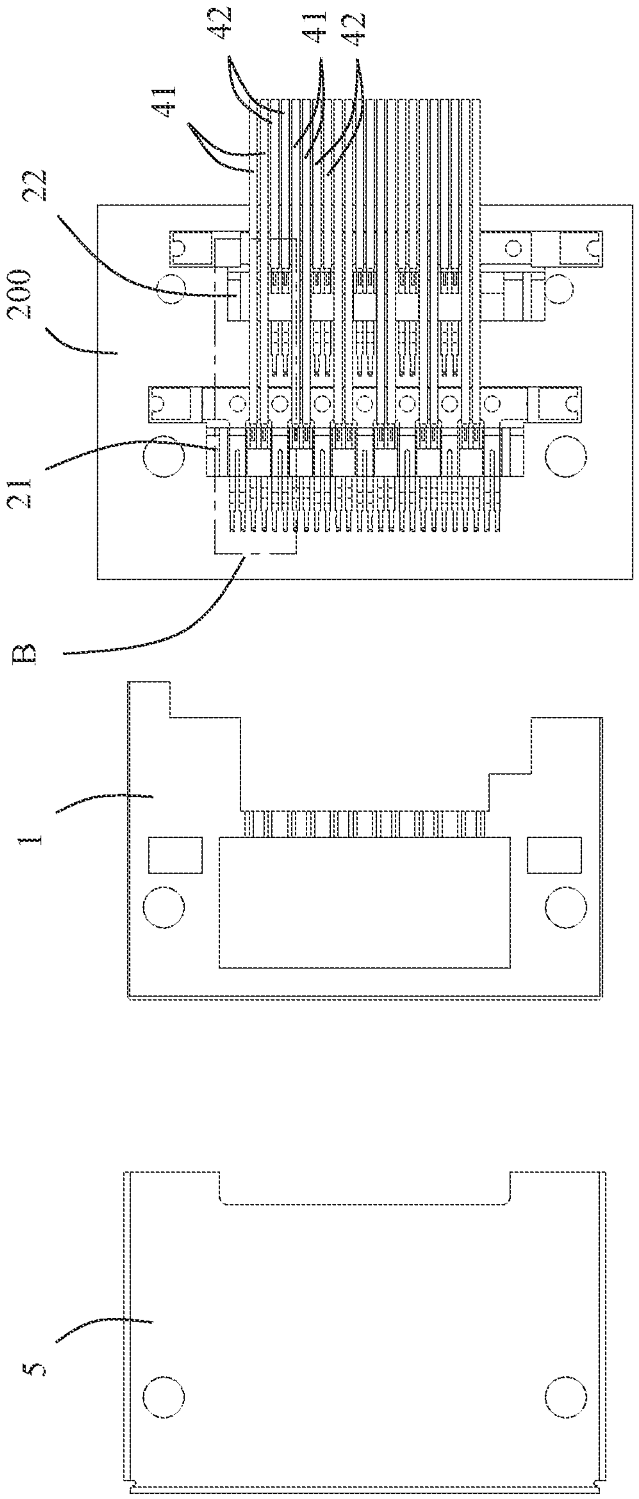
FIG. 8 is a top view of the wire-to-board connector assembly after some components are separated.
Figure 9:
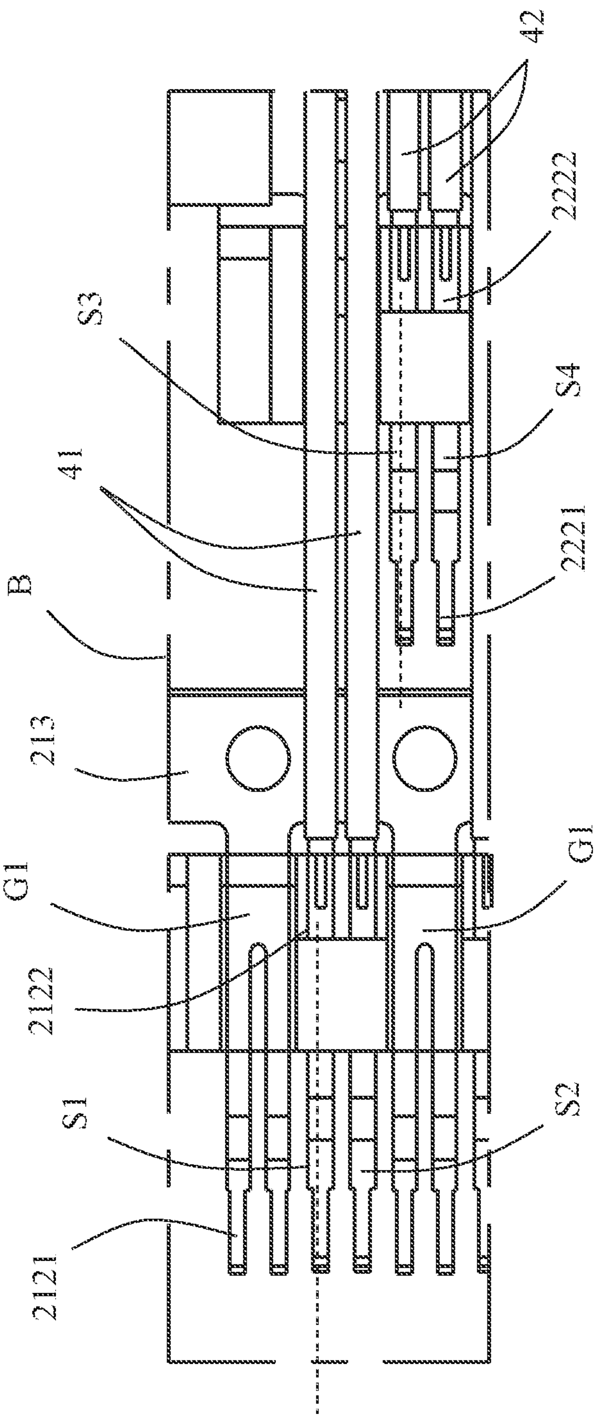
FIG. 9 is a partial enlarged view of a frame portion B in FIG. 8.
Figure 10:
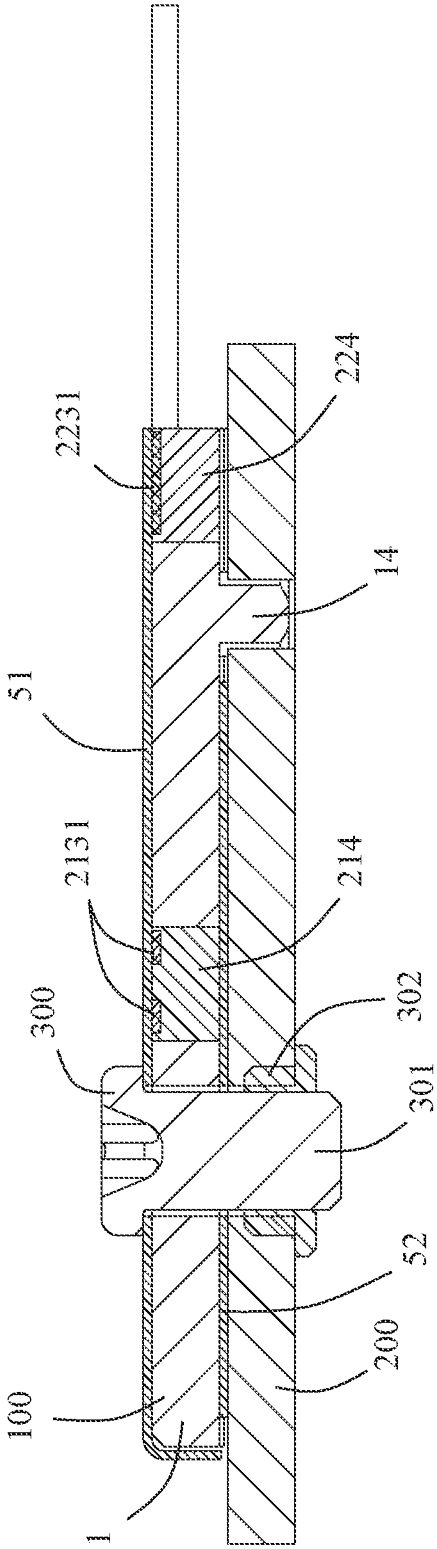
FIG. 10 is a schematic sectional view taken along line C-C in FIG. 1.
Figure 11:
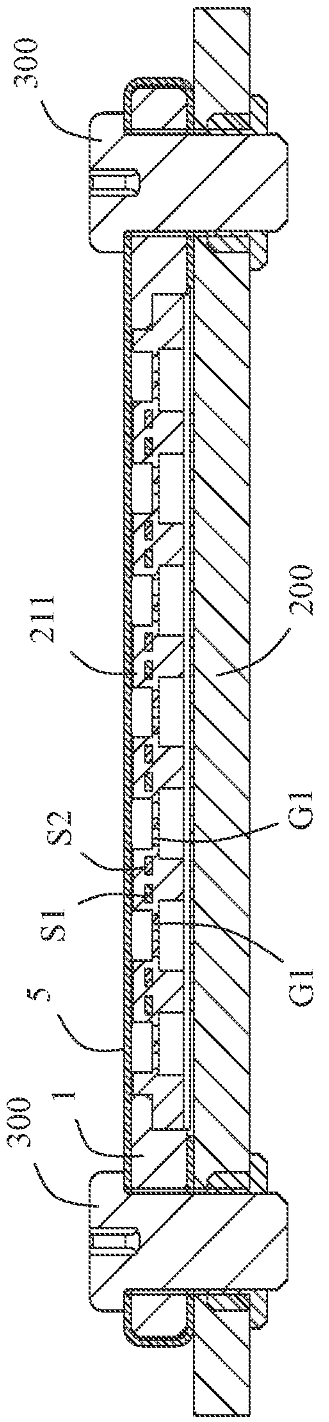
FIG. 11 is a schematic sectional view taken along line D-D in FIG. 1.

Referring to FIG. 8 and FIG. 9, in the embodiment shown in the present disclosure, the second cable 42 located between two adjacent first cables 41 is located in the middle of the two first cables 41; and the first cable 41 located between two adjacent second cables 42 is located in the middle of the two second cables 42. In this way, all the first cables 41 and all the second cables 42 have the same distance from one another.

Referring to FIG. 7, in the embodiment illustrated in the present disclosure, each first cable 41 is a coaxial cable, which includes a first core 411, a first insulating layer 412 wrapped on the first core 411, a first shielding layer 413 wrapped on the first insulating layer 412, and a first insulating skin (not shown) sleeved on the first shielding layer 413. The first core 411 is configured to be fixed with the first cable connection portion 2122 of the first cable conductive terminal 212 by soldering or welding. The first shielding layer 413 is connected to the first metal sheet 213 (for example, by soldering or welding). Preferably, the first shielding layer 413 is fixed to the first metal sheet 213 by welding.

Similarly, each second cable 42 is a coaxial cable, which includes a second core 421, a second insulating layer 422 wrapped on the second core 421, a second shielding layer 423 wrapped on the second insulating layer 422, and a second insulating skin (not shown) sleeved on the second shielding layer 423. The second core 421 is configured to be fixed with the second cable connection portion 2222 of the second cable conductive terminal 222 by soldering or welding. The second shielding layer 423 is connected to the second metal sheet 223 (for example, by soldering or welding). Preferably, the second shielding layer 423 is fixed to the second metal sheet 223 by welding.

In the illustrated embodiment of the present disclosure, although the lengths of the plurality of first cables 41 and the plurality of second cables 42 are different, the plurality of first cables 41 and the plurality of second cables 42 are all located on the same layer. The first cable connection portions 2122 of the plurality of first conductive terminals 212 and the second cable connection portions 2222 of the plurality of second conductive terminals 222 are arranged in a misalignment manner along the second direction A2-A2 so as to improve the convenience of arrangement and facilitate connection with corresponding cables.

Referring to FIG. 5 and FIG. 6, the outer metal shell 5 includes a first wall portion 51 (for example, a top wall), a second wall portion 52 (for example, a bottom wall) opposite to the first wall portion 51, a first side wall 53 connecting one side of the first wall portion 51 and one side of the second wall portion 52, a second side wall 54 connecting another side of the first wall portion 51 and another side of the second wall portion 52, and a receiving space 50 enclosed by the first wall portion 51, the second wall portion 52, the first side wall 53 and the second side wall 54. The insulating body 1 is at least partially received in the receiving space 50. The second wall portion 52 is disposed on the first surface 11 of the insulating housing 1. The second wall portion 52 abuts against the first surface 11 of the insulating housing 1. The second wall portion 52 is configured to be in contact with the metal ground pad 204 of the circuit board 200 so as to improve the ground shielding effect. The first wall portion 51 defines a plurality of first assembly holes 510. The second wall portion 52 defines a plurality of second assembly holes 520. The first assembly holes 510, the mounting through holes 13, the second assembly holes 520 and the mounting holes 205, which are corresponding to one another, are vertically aligned to install the fasteners 300.

Figure 12:
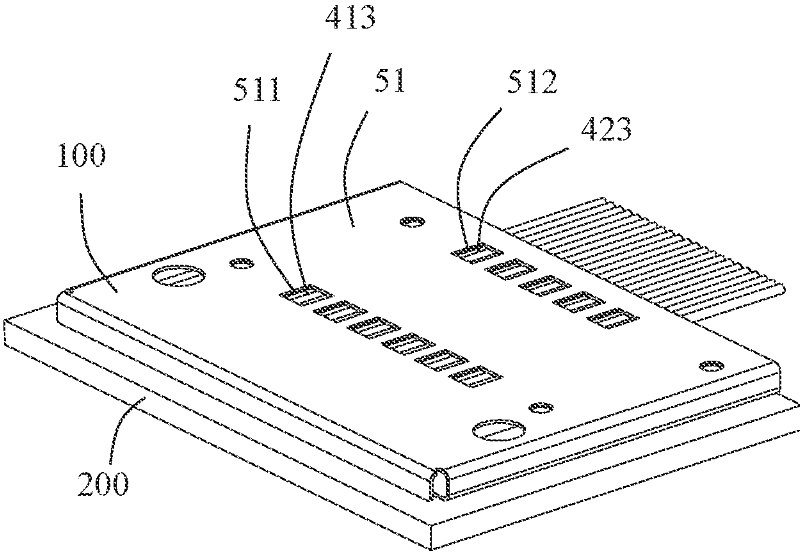
FIG. 12 is a schematic perspective view of the wire-to-board connector assembly in accordance with a second embodiment of the present disclosure.

Referring to FIG. 12, in the second embodiment of the present disclosure, when the first shielding layer 413 and the second shielding layer 423 are fixed to the first metal sheet 213 and the second metal sheet 223, respectively, by soldering or welding, in order to make up for defects caused by soldering or welding defects as much as possible, the first wall portion 51 may also be provided with a first repair opening 511 exposing the first shielding layer 413 for supplementary soldering or welding, and a second repair opening 512 exposing the second shielding layer 423 for supplementary soldering or welding. Repair soldering or welding can be performed by extending a soldering or welding torch from the first repair opening 511 and the second repair opening 512 into a soldering or welding position, which is beneficial to improve the yield rate of products.

Figure 13:
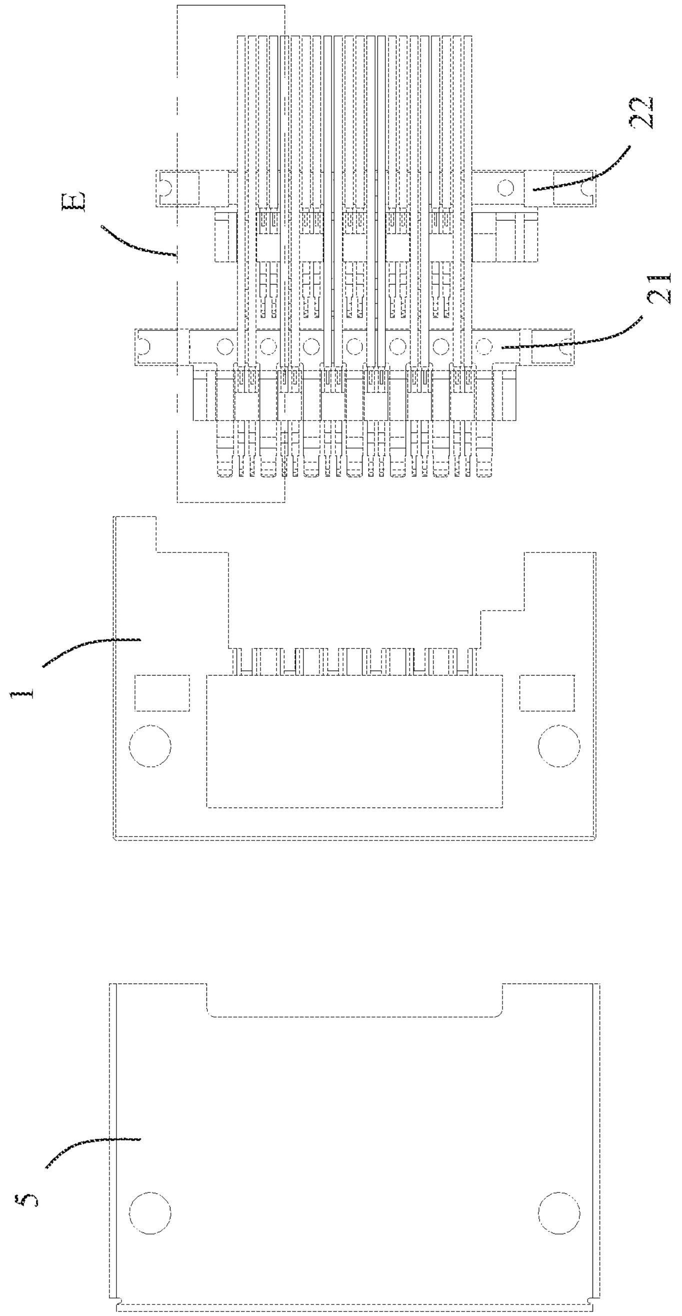
FIG. 13 is atop view of the wire-to-board connector assembly in accordance with a third embodiment of the present disclosure after some components are separated.
Figure 14:
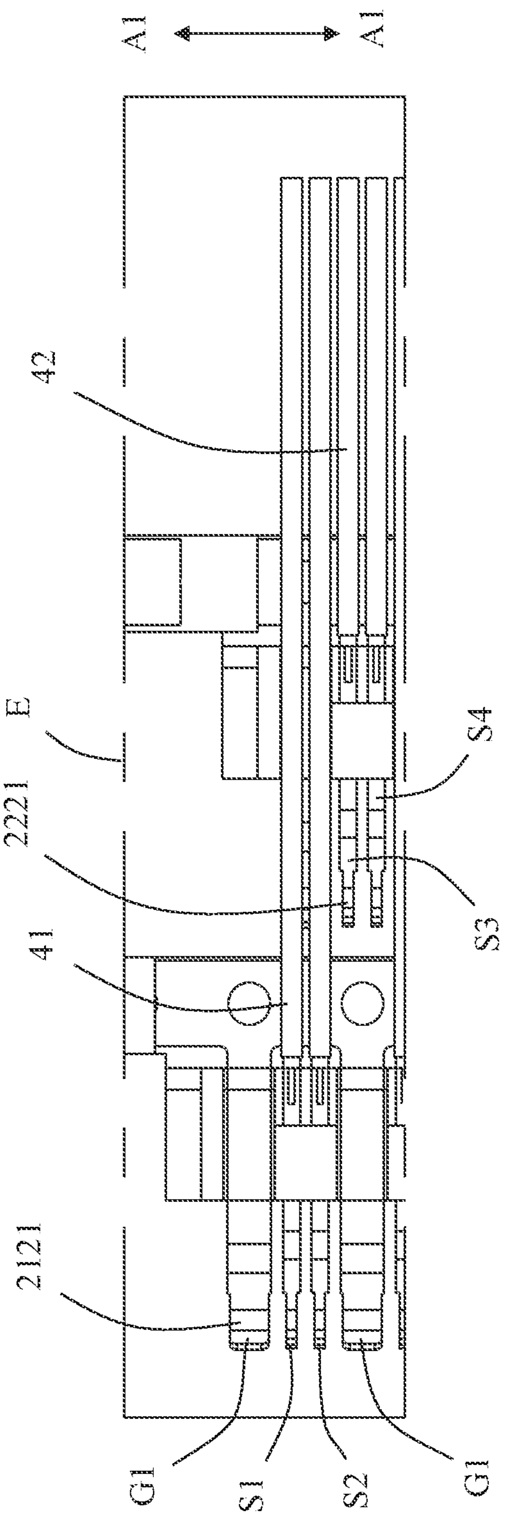
FIG. 14 is a partially enlarged view of a frame portion E in FIG. 13.

Referring to FIG. 13 and FIG. 14, in a third embodiment of the present disclosure, the first ground terminal G1 includes a single-piece first elastic mating portion 2121. A width of the first elastic mating portion 2121 of the first ground terminal G1 along the first direction A1-A1 is neither smaller than a width of the first elastic mating portion 2121 of the first signal terminal S1 along the first direction A1-A1, nor a width of the first elastic mating portion 2121 of the second signal terminal S2 along the first direction A1-A1.

Referring to FIG. 7 and FIG. 14, it is understandable to those skilled in the art that the second ground terminal G2 includes a single-piece second elastic mating portion 2221. A width of the second elastic mating portion 2221 of the second ground terminal G2 along the first direction A1-A1 is neither smaller than a width of the second elastic mating portion 2221 of the third signal terminal S3 along the first direction A1-A1, nor a width of the second elastic mating portion 2221 of the fourth signal terminal S4 along the first direction A1-A1.

Compared with the prior art, the plurality of first cables 41 and the plurality of second cables 42 in the present disclosure are located on the same layer, thereby avoiding the height required for cable stacking and facilitating the realization of the miniaturization and thinning of the wire-to-board connector 100. In addition, by arranging the first cable connection portions 2122 of the plurality of first conductive terminals 212 and the second cable connection portions 2222 of the plurality of second conductive terminals 222 in the misalignment manner along the second direction A2-A2, it is beneficial to simplify the arrangement of the first conductive terminals 212 and the second conductive terminals 222, and improve the convenience of connecting with the first cables 41 and the second cables 42.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A wire-to-board connector, comprising:

an insulating body comprising a first surface;

a plurality of first conductive terminals arranged at intervals along a first direction, each first conductive terminal comprising a first elastic mating portion, at least part of the plurality of first conductive terminals comprising a first cable connection portion;

a plurality of second conductive terminals arranged at intervals along the first direction, each second conductive terminal comprising a second elastic mating portion, at least part of the plurality of second conductive terminals comprising a second cable connection portion; the first elastic mating portion, the first cable connection portion, the second elastic mating portion and the second cable connection portion being arranged in sequence along a second direction which is perpendicular to the first direction; the first cable connection portions of the plurality of first conductive terminals being flush with the second cable connection portions of the plurality of second conductive terminals;

a plurality of first cables connected to the first cable connection portions of the plurality of first conductive terminals; and a plurality of second cables connected to the second cable connection portions of the plurality of second conductive terminals;

wherein the plurality of first cables and the plurality of second cables are located on a same layer; the first cable connection portions of the plurality of first conductive terminals and the second cable connection portions of the plurality of second conductive terminals are arranged in a misalignment manner along the second direction, so that the first cable connection portions of the plurality of first conductive terminals and the second cable connection portions of the plurality of second conductive terminals do not overlap in the second direction; the first elastic mating portions and the second elastic mating portions protrude beyond the first surface of the insulating body; and the first elastic mating portions and the second elastic mating portions are configured to abut against metal conductive pads on a circuit board;

wherein the plurality of first conductive terminals comprise a plurality of first signal terminals, a plurality of second signal terminals and a plurality of first ground terminals; wherein adjacent first signal terminal and the second signal terminal form a first differential pair; and each of two sides of the first differential pair is provided with one first ground terminal;

the plurality of second conductive terminals comprises a plurality of third signal terminals, a plurality of fourth signal terminals and a plurality of second ground terminals; wherein adjacent third signal terminal and the fourth signal terminal form a second differential pair; and each of two sides of the second differential pair is provided with one second ground terminal;

the wire-to-board connector further comprises an outer metal shell mounted on the insulating body; the first terminal module comprises a first metal sheet; wherein the plurality of first ground terminals are integrally formed with the first metal sheet, the first metal sheet is provided with a first grounding portion, the insulating body defines a first notch, and the first grounding portion is exposed to the insulating body through the first notch;

the second terminal module comprises a second metal sheet; wherein the plurality of second ground terminals are integrally formed with the second metal sheet, the second metal sheet is provided with a second grounding portion, the insulating body defines a second notch, and the second grounding portion is exposed to the insulating body through the second notch;

wherein both the first grounding portion and the second grounding portion are in contact with the outer metal shell;

wherein the first cable comprises a first shielding layer which is connected to the first metal sheet; and the second cable comprises a second shielding layer which is connected to the second metal sheet;

wherein the outer metal shell comprises a first wall portion, a second wall portion opposite to the first wall portion, a first side wall connecting one side of the first wall portion and one side of the second wall portion, a second side wall connecting another side of the first wall portion and another side of the second wall portion, and a receiving space enclosed by the first wall portion, the second wall portion, the first side wall and the second side wall; the insulating body is at least partially received in the receiving space;

the first shielding layer is fixed to the first metal sheet by soldering or welding; the second shielding layer is fixed to the second metal sheet by soldering or welding; the first wall portion is provided with a first repair opening exposing the first shielding layer for supplementary soldering or welding, and a second repair opening exposing the second shielding layer for supplementary soldering or welding.

2. The wire-to-board connector according to claim 1, wherein the outer metal shell comprises a first wall portion, a second wall portion opposite to the first wall portion, a first side wall connecting one side of the first wall portion and one side of the second wall portion, a second side wall connecting another side of the first wall portion and another side of the second wall portion, and a receiving space enclosed by the first wall portion, the second wall portion, the first side wall and the second side wall; the insulating body is at least partially received in the receiving space; the second wall portion is arranged on the first surface of the insulating body; the second wall portion is configured to be in contact with a metal ground pad of the circuit board.

3. The wire-to-board connector according to claim 1, wherein the first elastic mating portions of the plurality of first conductive terminals are arranged in a first row; the first cable connection portions of the plurality of first conductive terminals are arranged in a second row; the second elastic mating portions of the plurality of second conductive terminals are arranged in a third row; the second cable connection portions of the plurality of second conductive terminals are arranged in a fourth row; the first row, the second row, the third row and the fourth row are parallel to one another; and the first row, the second row, the third row and the fourth row are arranged at intervals along the second direction.

4. The wire-to-board connector according to claim 1, further comprising a first terminal module and a second terminal module; the first terminal module comprising a first insulating block and the plurality of first conductive terminals; wherein the plurality of first conductive terminals are fixed to the first insulating block; and the first cable connection portions of the plurality of first conductive terminals are arranged on the first insulating block;

the second terminal module comprises a second insulating block and the plurality of second conductive terminals; wherein the plurality of second conductive terminals are fixed to the second insulating block; and the second cable connection portions of the plurality of second conductive terminals are arranged on the second insulating block.

5. The wire-to-board connector according to claim 4, wherein the first terminal module and the second terminal module are of a same configuration.

6. The wire-to-board connector according to claim 4, wherein the insulating body comprises a first receiving opening extending through the first surface, a second receiving opening extending through the first surface, and a partition wall located between the first receiving opening and the second receiving opening in the second direction; the first insulating block of the first terminal module is at least partially installed in the first receiving opening; the second insulating block of the second terminal module is at least partially installed in the second receiving opening; and the partition wall defines a plurality of cable positioning slots for positioning the plurality of first cables.

7. The wire-to-board connector according to claim 1, wherein the first ground terminal comprises two bifurcated first elastic mating portions; a sum of widths of the two bifurcated first elastic mating portions of the first ground terminal along the first direction is neither smaller than a width of the first elastic mating portion of the first signal terminal along the first direction, nor a width of the second elastic mating portion of the second signal terminal along the first direction;

or wherein the first ground terminal comprises a single-piece first elastic mating portion; a width of the single-piece first elastic mating portion of the first ground terminal along the first direction is neither smaller than the width of the first elastic mating portion of the first signal terminal along the first direction, nor the width of the second elastic mating portion of the second signal terminal along the first direction.

8. The wire-to-board connector according to claim 7, wherein the second ground terminal comprises two bifurcated second elastic mating portions; a sum of widths of the two bifurcated second elastic mating portions of the second ground terminal along the first direction is neither smaller than a width of the second elastic mating portion of the third signal terminal along the first direction, nor a width of the second elastic mating portion of the fourth signal terminal along the first direction;

or wherein the second ground terminal comprises a single-piece second elastic mating portion; a width of the single-piece second elastic mating portion of the second ground terminal along the first direction is neither smaller than the width of the second elastic mating portion of the third signal terminal along the first direction, nor the width of the second elastic mating portion of the fourth signal terminal along the first direction.

9. A wire-to-board connector assembly, comprising:

a circuit board comprising a plurality of metal conductive pads;

a wire-to-board connector mounted on the circuit board; and a fastener fixing the wire-to-board connector to the circuit board;

wherein the wire-to-board connector comprises:

an insulating body comprising a first surface;

a plurality of first conductive terminals arranged at intervals along a first direction, each first conductive terminal comprising a first elastic mating portion, at least part of the plurality of first conductive terminals comprising a first cable connection portion;

a plurality of second conductive terminals arranged at intervals along the first direction, each second conductive terminal comprising a second elastic mating portion, at least part of the plurality of second conductive terminals comprising a second cable connection portion; the first elastic mating portion, the first cable connection portion, the second elastic mating portion and the second cable connection portion being arranged in sequence along a second direction which is perpendicular to the first direction; the first cable connection portions of the plurality of first conductive terminals being flush with the second cable connection portions of the plurality of second conductive terminals;

a plurality of first cables connected to the first cable connection portions of the plurality of first conductive terminals; and a plurality of second cables connected to the second cable connection portions of the plurality of second conductive terminals;

wherein the first cable connection portions of the plurality of first conductive terminals and the second cable connection portions of the plurality of second conductive terminals are arranged in a misalignment manner along the second direction, so that the first cable connection portions of the plurality of first conductive terminals and the second cable connection portions of the plurality of second conductive terminals do not overlap in the second direction; the first elastic mating portions and the second elastic mating portions protrude beyond the first surface of the insulating body to abut against the plurality of metal conductive pads of the circuit board;

wherein the plurality of first conductive terminals comprise a plurality of first signal terminals, a plurality of second signal terminals and a plurality of first ground terminals; wherein adjacent first signal terminal and the second signal terminal form a first differential pair; and each of two sides of the first differential pair is provided with one first ground terminal;

the plurality of second conductive terminals comprises a plurality of third signal terminals, a plurality of fourth signal terminals and a plurality of second ground terminals; wherein adjacent third signal terminal and the fourth signal terminal form a second differential pair; and each of two sides of the second differential pair is provided with one second ground terminal;

the wire-to-board connector further comprises an outer metal shell mounted on the insulating body; the first terminal module comprises a first metal sheet; the plurality of first ground terminals are integrally formed with the first metal sheet, the first metal sheet is provided with a first grounding portion, the insulating body defines a first notch, and the first grounding portion is exposed to the insulating body through the first notch;

the second terminal module comprises a second metal sheet; wherein the plurality of second ground terminals are integrally formed with the second metal sheet, the second metal sheet is provided with a second grounding portion, the insulating body defines a second notch, and the second grounding portion is exposed to the insulating body through the second notch;

wherein both the first grounding portion and the second grounding portion are in contact with the outer metal shell;

wherein the first cable comprises a first shielding layer which is connected to the first metal sheet; and the second cable comprises a second shielding layer which is connected to the second metal sheet;

wherein the outer metal shell comprises a first wall portion, a second wall portion opposite to the first wall portion, a first side wall connecting one side of the first wall portion and one side of the second wall portion, a second side wall connecting another side of the first wall portion and another side of the second wall portion, and a receiving space enclosed by the first wall portion, the second wall portion, the first side wall and the second side wall; the insulating body is at least partially received in the receiving space;

the first shielding layer is fixed to the first metal sheet by soldering or welding; the second shielding layer is fixed to the second metal sheet by soldering or welding; the first wall portion is provided with a first repair opening exposing the first shielding layer for supplementary soldering or welding, and a second repair opening exposing the second shielding layer for supplementary soldering or welding.

10. The wire-to-board connector assembly according to claim 9, the wire-to-board connector further comprises a first terminal module and a second terminal module; the first terminal module comprises a first insulating block and the plurality of first conductive terminals; the plurality of first conductive terminals are fixed to the first insulating block; and the first cable connection portions of the plurality of first conductive terminals are arranged on the first insulating block;

the second terminal module comprises a second insulating block and the plurality of second conductive terminals; wherein the plurality of second conductive terminals are fixed to the second insulating block; and the second cable connection portions of the plurality of second conductive terminals are arranged on the second insulating block.

11. The wire-to-board connector assembly according to claim 9, wherein the outer metal shell comprises a first wall portion, a second wall portion opposite to the first wall portion, a first side wall connecting one side of the first wall portion and one side of the second wall portion, a second side wall connecting another side of the first wall portion and another side of the second wall portion, and a receiving space enclosed by the first wall portion, the second wall portion, the first side wall and the second side wall; the insulating body is at least partially received in the receiving space; the second wall portion is arranged on the first surface of the insulating body; the second wall portion is configured to be in contact with a metal ground pad of the circuit board.

12. The wire-to-board connector assembly according to claim 9, wherein the first elastic mating portions of the plurality of first conductive terminals are arranged in a first row; the first cable connection portions of the plurality of first conductive terminals are arranged in a second row; the second elastic mating portions of the plurality of second conductive terminals are arranged in a third row; the second cable connection portions of the plurality of second conductive terminals are arranged in a fourth row; the first row, the second row, the third row and the fourth row are parallel to one another; and the first row, the second row, the third row and the fourth row are arranged at intervals along the second direction.

* * * * *